United States Patent [19]
Zhang et al.

[11] Patent Number: 5,889,073
[45] Date of Patent: Mar. 30, 1999

[54] PROCESS FOR PRODUCING MATERIAL WITH HYDROPHILIC SURFACE

[75] Inventors: Husheng Zhang, Ibaraki; Takanori Anazawa; Hiroshi Ebato, both of Chiba, all of Japan

[73] Assignees: Dainippon Ink & Chemicals, Inc., Tokyo; Kawamura Institute of Chemical Research, Sakura, both of Japan

[21] Appl. No.: 959,981

[22] Filed: Oct. 29, 1997

[30] Foreign Application Priority Data

May 21, 1997 [JP] Japan ................................. 9-130965

[51] Int. Cl.$^6$ .............................. C08F 2/46; C08F 16/06; C08J 9/04; C08J 5/00
[52] U.S. Cl. ..................................... 522/3; 522/6; 522/84; 522/79; 522/88; 522/89; 525/54.3; 525/54.2; 524/831; 524/845; 527/313; 527/314
[58] Field of Search .................. 522/84, 86, 87, 522/88, 184, 186, 149, 89; 527/313, 314; 525/54.2–54.26; 524/831, 845

[56] References Cited

U.S. PATENT DOCUMENTS

| | | | |
|---|---|---|---|
| 3,090,664 | 5/1963 | Cline et al. | 8/115.5 |
| 4,196,065 | 4/1980 | Gaussens et al. | 204/159.17 |
| 4,256,782 | 3/1981 | Tazuke et al. | 427/53.1 |
| 4,338,269 | 7/1982 | Russel | 522/89 |
| 4,355,053 | 10/1982 | Nezu et al. | 427/54.1 |
| 4,663,163 | 5/1987 | Hou et al. | 424/101 |
| 4,740,282 | 4/1988 | Gesser et al. | 204/165 |
| 5,051,312 | 9/1991 | Allmer | 428/458 |
| 5,567,435 | 10/1996 | Hubbell et al. | 424/426 |
| 5,773,488 | 6/1998 | Allmer | 522/46 |

FOREIGN PATENT DOCUMENTS

| | | |
|---|---|---|
| 2 058 802 A | 4/1981 | United Kingdom . |
| 1601529 | 10/1981 | United Kingdom . |
| 1601539 | 10/1981 | United Kingdom . |
| 2 082 599 A | 3/1982 | United Kingdom . |

OTHER PUBLICATIONS

Evaluation of photochemically modified poly(arylsulfone) uttrafiltration membranes. J.of Membrane Sci. 105 (1995) 249–259.

Surface Modification of Polymers–III. Photo–Initiated grafting of water soluble vinyl monomers and influence on fibrinogen adsorption. Eru. Polym. J. vol. 31 No. 5, 431–435, 1995.

*Primary Examiner*—James J. Seidleck
*Assistant Examiner*—Sanza McClendon
*Attorney, Agent, or Firm*—Armstrong, Westerman, Hattori, McLeland & Naughton

[57] ABSTRACT

Disclosed is a process for producing a material having hydrophilic surface which comprises forming a hydrophobic photopolymerizable composition comprising a hydrophobic compound (a) having two or more polymerizable unsaturated double bonds per molecule and a photopolymerization initiator into a desired form and irradiating the resultant shape (b) with actinic rays while keeping the surface of the shape (b) in contact with a hydrophilic liquid (d) containing a hydrophilic compound (c) having one or more polymerizable unsaturated double bonds under such conditions that a photopolymerization reaction is prevented from occurring in the hydrophilic liquid (d) except at the interface between the liquid (d) and the shape (b), whereby the shape (b) is cured and, at the same time, the hydrophobic compound (a) is copolymerized with the hydrophilic compound (c) at the interface between the shape (b) and the hydrophilic liquid (d) to chemically bond molecules of the hydrophilic compound (c) to the surface of the hydrophobic shape (b). The process is advantageous in that the kind and density of hydrophilic groups can be easily controlled and the structure and properties inherent in the material formed from the photopolymerizable composition are not impaired.

12 Claims, No Drawings

PROCESS FOR PRODUCING MATERIAL WITH HYDROPHILIC SURFACE

FIELD OF THE INVENTION

The present invention relates to processes for producing a material having hydrophilic surface which is used not only in various fields such as separation membranes, electronic industry, food industry, medical applications and treatments (including medical goods, e.g., artificial organs, and examination), medicinal industry, wastewater treatment, and printing materials as a material reduced in the adsorption of proteins, colloids, bacterium, humin, fats and oils, contaminants present in the air, etc., as a biocompatible material, or as a support for immobilizing enzymes, microorganisms, or the like without denaturing the same, but also in the agricultural and other fields as an antifogging film or antifogging coating film.

BACKGROUND OF THE INVENTION

Materials used in the fields mentioned above have some problems. The first problem is the adsorption of proteins, fats and oils, humin, and other substances onto the surfaces of these materials. In the field of separation membranes, for example, there is a problem that the adsorption of such substances causes a decrease in permeation flux. The second problem is insufficient biocompatibility in the medical field, as in artificial organs; the insufficient biocompatibility is causative of thrombus, hemolysis, sensitization, antigen-antibody reaction, etc. The third problem is static build-up, which is serious especially in the field of electronic industry.

A generally employed method for eliminating those problems is to hydrophilize the surface of material. However, this method, in which a surface treatment is conducted to impart hydrophilicity to material surface, is disadvantageous in that the attainable degree of hydrophilicity is low and that the efficiency of material production inevitably decreases due to an increase in the number of steps because of the hydrophilizing treatment which should be conducted after forming.

On the other hand, methods for directly producing a material having hydrophilic surface are to use a polymer having hydrophilic groups as a raw material or coating material, and to incorporate a hydrophilic substance into a material through kneading. For example, methods for the prevention of static build-up are described in Kōbunshi Hyōmen No Kiso To Ōyō (Ge) [The Fundamentals and Applications of Polymer Surfaces (the last volume)], Kagaku Doojin K.K., p.72 (1986), which comprise producing a material having a hydrophilic surface by applying a surfactant to the surface of a material or by incorporating a surfactant into a material through kneading. Besides surfactants, carbon is also used as a hydrophilizing agent incorporated through kneading.

However, such methods based on the incorporation of a hydrophilizing agent through kneading necessarily have the following drawbacks. Since a surfactant should be incorporated in a large amount in order to obtain sufficient hydrophilicity, the surfactant is released from the surfaces of the resultant materials and the materials have considerably impaired properties. On the other hand, the method in which a hydrophilic polymer is used as a raw material or a coating material has problems of dimensional change due to moisture absorption, strength decrease in a wet state, and peeling in wet state from the substrate, although free from the problem of the release of a hydrophilic substance.

SUMMARY OF THE INVENTION

An object of the present invention is to provide a material which has a surface having sufficient hydrophilicity and durability and is free from a decrease in performance resulting from the impartation of hydrophilicity. Another object of the present invention is to provide a process for producing the material without increasing the number of process steps. More specifically, one of the objects of the present invention is to provide a material having hydrophilic surface which has hydrophilic groups bonded to the material surface by covalent bonding and contains no internal hydrophilic groups which do not contribute to hydrophilic surface, and in which the surface hydrophilic groups can thereby fully perform their functions without exerting an adverse influence on the physical structure and properties of the material, etc. The other object of the invention is to provide a process for producing the above material through a single step.

As a result of intensive investigations made by the present inventors in order to eliminate the problems described above, they have found that a material having hydrophilic surface can be easily produced by forming a hydrophobic photopolymerizable composition comprising a hydrophobic compound (a) having two or more polymerizable unsaturated double bonds per molecule and a photopolymerization initiator into a desired form and irradiating the resultant shape (b) with actinic rays while keeping the surface of the shape (b) in contact with a hydrophilic liquid (d) containing a hydrophilic compound (c) having one or more polymerizable unsaturated double bonds under such conditions that a photopolymerization reaction is prevented from occurring in the hydrophilic liquid (d) except at the interface between the liquid (d) and the shape (b), whereby the shape (b) is cured and, at the same time, the hydrophobic compound (a) is copolymerized with the hydrophilic compound (c) at the interface between the shape (b) and the hydrophilic liquid (d) to chemically bond molecules of the hydrophilic compound (c) to the surface of the hydrophobic shape (b). It has also been found that this process is advantageous in that the kind and density of hydrophilic groups can be easily controlled and the structure and properties inherent in the material formed from the photopolymerizable composition are not impaired. The present invention has been achieved based on these findings.

In order to accomplish the objects described above, the present invention provides:

[I] A process for producing a material having hydrophilic surface which comprises:

(1) the first step of forming a hydrophobic photopolymerizable composition comprising a hydrophobic compound (a) having two or more polymerizable unsaturated double bonds per molecule and a photopolymerization initiator into a desired form selected from thin film, fiber, bead, and other forms to produce a shape (b);

(2) the second step of bringing the surface of the shape (b) into contact with a hydrophilic liquid (d) containing a hydrophilic compound (c) having one or more polymerizable unsaturated double bonds; and (3) the third step of irradiating the shape (b) with actinic rays while keeping the shape (b) in contact with the hydrophilic liquid (d), (4) said third step being conducted in such a manner that
  (i) the shape (b) is cured,
  (ii) the hydrophobic compound (a) is copolymerized with the hydrophilic compound (c) at the interface between the shape (b) and the hydrophilic liquid (d) to thereby chemically bond molecules of the hydrophilic compound (c) to the surface of the hydrophobic shape (b), and (iii) the hydrophilic liquid (d) is prevented from undergoing any photopolymerization reaction therein except at said interface;

[II] A process for producing a material having hydrophilic surface which comprises:

(1) the first step of forming a hydrophobic photopolymerizable composition comprising a hydrophobic compound (a) having two or more polymerizable unsaturated double bonds per molecule and a photopolymerization initiator into a desired form selected from thin film, fiber, bead, and other forms to produce a shape (b);

(2) the second step of irradiating the shape (b) with actinic rays to precure the shape (b) to such a degree that the resultant precured shape (b) has polymerizable unsaturated double bonds remaining at least on the surface thereof;

(3) the third step of bringing the surface of the precured shape (b) into contact with a hydrophilic liquid (d) containing a hydrophilic compound (c) having one or more polymerizable unsaturated double bonds; and (4) the fourth step of irradiating the precured shape (b) with actinic rays while keeping the precured shape (b) in contact with the hydrophilic liquid (d), (5) said fourth step being conducted in such a manner that
   (i) the precured shape (b) is completely cured,
   (ii) the hydrophobic compound (a) is copolymerized with the hydrophilic compound (c) at the interface between the shape (b) and the hydrophilic liquid (d) to thereby chemically bond molecules of the hydrophilic compound (c) to the surface of the hydrophobic shape (b), and
   (iii) the hydrophilic liquid (d) is prevented from undergoing any photopolymerization reaction therein except at said interface;

[III] The process as described in [I] or [II] above, wherein the shape (b) is brought into contact with the hydrophilic liquid (d) by immersing the shape (b) in the hydrophilic liquid (d);

[IV] The process as described in [I] or [II] above, wherein the photopolymerizable composition contains an ingredient which is miscible with the hydrophobic compound (a) having two or more polymerizable unsaturated double bonds per molecule and in which the cured polymer formed from the hydrophobic compound (a) having two or more polymerizable unsaturated double bonds per molecule neither dissolves nor swells;

[V] The process as described in [I] or [II] above, wherein the hydrophilic liquid (d) contains a surfactant;

[VI] The process as described in [I] or [II] above, wherein the hydrophilic compound (c) having one or more polymerizable unsaturated double bonds is a compound having amino acid structure in the molecule; and

[VII] The process as described in [I] or [II] above, wherein the compound (c) having one or more polymerizable unsaturated double bonds and one or more hydrophilic groups is a compound having saccharide structure in the molecule.

DETAILED DESCRIPTION OF THE INVENTION

The hydrophobic photopolymerizable composition for use in the present invention should be capable of being formed into a shape and of substantially retaining the shape throughout the period of from contact with a hydrophilic liquid (d) and the initiation of irradiation with actinic rays to the completion of curing. In order for the composition to satisfy the above, the hydrophobic compound (a) having two or more polymerizable unsaturated double bonds, which is the main component of the hydrophobic photopolymerizable composition, is preferably insoluble in the hydrophilic liquid (d), or the hydrophobic photopolymerizable composition preferably has a high viscosity.

The hydrophobic compound (a) having two or more polymerizable unsaturated double bonds per molecule for use in the processes of the present invention may be any compound as long as it crosslinks and polymerizes to give a hydrophobic polymer when irradiated with actinic rays, e.g., ultraviolet rays, visible rays, or infrared rays, in the presence of a photopolymerization initiator. It may, for example, be a radical-polymerizable compound or an anionically or cationically polymerizable compound. Examples of the hydrophobic compound (a) having two or more polymerizable unsaturated double bonds per molecule include monomers and/or oligomers each having per molecule two or more polymerizable unsaturated double bonds such as vinyl, vinylidene, acryloyl, and methacryloyl groups. [Hereinafter, an acryloyl group and a methacryloyl group are inclusively referred to as a (meth)acryloyl group; the same applies to (meth)acrylic, (meth)acrylate, and the like.] Preferred among those are monomers and/or oligomers each having two or more (meth)acryloyl groups per molecule because these compounds polymerize at a high rate upon irradiation with actinic rays.

Specific examples of the hydrophobic compound (a) having two or more polymerizable unsaturated double bonds per molecule for use in the processes of the present invention include bifunctional monomers such as 1,6-hexanediol di(meth)acrylate, polypropylene glycol di(meth)acrylate, hydroxypivalic acid neopentyl glycol di(meth)acrylate, neopentyl glycol di(meth)acrylate, 3-acryloyloxyglycerol monomethacrylate, 2,2'-bis(4-(meth) acryloyloxypolyethylene-oxyphenyl) propane, 2,2'-bis(4-(meth) acryloyloxypolypropyleneoxyphenyl)propane, dicyclopentanyl di(meth)acrylate, bis[(meth)acryloyloxyethyl] hydroxyethyl isocyanate, phenyl glycidyl ether acrylate tolylene diisocyanate, and divinyl adipate; trifunctional monomers such as trimethylolpropane tri(meth)acrylate, trimethylolethane tri(meth)acrylate, tris[(meth) acryloyloxyethyl] isocyanate, and pentaerythritol tri(meth) acrylate; tetrafunctional monomers such as pentaerythritol tetra(meth)acrylate and glycerol di(meth)acrylate hexamethylene diisocyanate; pentafunctional monomers such as dipentaerythritol monohydroxypenta(meth)acrylate; and hexafunctional monomers such as dipentaerythritol hexa (meth)acrylate.

In the case where an oligomer (a) having (meth)acryloyl groups is used as the hydrophobic compound (a) having two or more polymerizable unsaturated double bonds per molecule, it is an oligomer having two or more (meth) acryloyl groups per molecule and preferably having a molecular weight of from 500 to 50,000. Examples of this oligomer include (meth)acrylic esters of epoxy resins, such as a bisphenol A/diepoxy(meth)acrylic acid adduct, (meth) acrylic esters of polyether resins, (meth)acrylic esters of polybutadiene resins, and polyurethane resins having (meth) acrylic groups at molecular ends.

These hydrophobic compounds (a) having two or more polymerizable unsaturated double bonds per molecule can be used alone or as a mixture of two or more thereof. For example, a mixture of monomers or oligomers or a mixture of a monomer and an oligomer may be used.

In the hydrophobic photopolymerizable composition for use in the present invention, the hydrophobic compound (a)

having two or more polymerizable unsaturated double bonds per molecule can be contained in combination with a hydrophobic compound having one polymerizable unsaturated double bond per molecule. By selecting the kind and proportion of the hydrophobic compound having one polymerizable unsaturated double bond per molecule, the resultant base material [i.e., the cured shape (b)] for a material having hydrophilic surface can be regulated so as to have any desired crosslink density. For example, a material excellent in heat resistance, solvent resistance, swelling resistance, hardness, and strength may be obtained by a method in which a hydrophobic compound having a larger number of polymerizable unsaturated double bonds per molecule is selected as the hydrophobic compound (a) having two or more polymerizable unsaturated double bonds per molecule to thereby yield therefrom a polymer having a heightened crosslink density. In contrast, in the case where thermoplasticity, flexibility, elongation, and the like are required, a material having such properties may be obtained by a method in which a hydrophobic compound having one polymerizable unsaturated double bond per molecule is used in a larger proportion to thereby yield a polymer having a relatively low crosslink density. A suitable one can be selected from these methods according to the desired properties of the material to be obtained. Whichever method is selected, the use of a hydrophobic compound (a) having two or more polymerizable unsaturated double bonds per molecule in the hydrophobic photopolymerizable composition is indispensable for obtaining a material having excellent hydrophilic surface in heat resistance, mechanical strength, hardness, dimensional stability, solvent resistance, etc.

Examples of the hydrophobic compound having one polymerizable unsaturated double bond per molecule, which can be optionally incorporated into the hydrophobic photopolymerizable composition, include ethyl (meth)acrylate, n-butyl (meth)acrylate, isobutyl (meth)acrylate, t-butyl (meth)acrylate, hexyl (meth)acrylate, 2-ethylhexyl (meth)acrylate, lauryl (meth)acrylate, stearyl (meth)acrylate, phenyl (meth)acrylate, phenyl Cellosolve (meth)acrylate, nonylphenoxy polyethylene glycol (meth)acrylate, isobornyl (meth)acrylate, dicyclopentanyl (meth)acrylate, and dicyclopentenyloxyethyl (meth)acrylate.

The cured shape (b) formed from the hydrophobic photopolymerizable composition described above can be a base material not swelling in water. The term "not swelling in water" as used herein means that when the material is immersed in 20° C. water, the resultant weight increase is not higher than 5% based on the weight of the dry material. Due to the property of not swelling in water, the material has water resistance and suffers no decrease in strength even in a wet state.

The photopolymerization initiator for use in the present invention is not particularly limited as long as it is sensitive to the actinic rays to be used and is capable of polymerizing a hydrophobic compound (a) having two or more polymerizable unsaturated double bonds with a hydrophilic compound (c) having one or more polymerizable unsaturated double bonds. For example, it may be a radical polymerization initiator, an anionic polymerization initiator, or a cationic polymerization initiator. Examples of the photopolymerization initiator include acetophenone derivatives such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin and benzoin ethers such as benzoin methyl ether, benzoin isopropyl ether, and benzoin isobutyl ether; and benzyl ketals such as benzyl dimethyl ketal and hydroxycyclohexyl phenyl ketone.

Although the photopolymerization initiator used in the hydrophobic photopolymerizable composition may be in a dissolved or dispersed state in the composition, it preferably dissolves in the hydrophobic photopolymerizable composition. The concentration of the photopolymerization initiator in the hydrophobic photopolymerizable composition is preferably from 0.01 to 20% by weight, more preferably from 0.5 to 10% by weight.

The hydrophobic photopolymerizable composition for use in the present invention can contain other ingredients, which may be present therein in a dissolved or non-dissolved state. Examples of such optional ingredients include polymers which function as a thickening agent for the photopolymerizable composition, polymers which function as a property improver for the final material, inorganic ingredients such as fillers, reinforcements such as aramid fibers, colorants, chemicals such as antiseptics, and poor solvents for forming a porous material.

The hydrophilic compound (c) having one or more polymerizable unsaturated double bonds for use in the processes of the present invention is a compound having in the molecule one or more polymerizable unsaturated double bonds and one or more hydrophilic groups. When the hydrophilic liquid (d) which contains the hydrophilic compound (c) and is kept in contact with a shape (b) formed from the hydrophobic polymerizable composition is irradiated with actinic rays, then the compound (c) should undergo no photopolymerization reaction except at the interface between the hydrophobic shape (b) and the hydrophilic liquid (d). In order for a hydrophilic compound (c) having one or more polymerizable unsaturated double bonds to satisfy the above requirement, it should be a compound which, upon irradiation with actinic rays, polymerizes in the presence of a photopolymerization initiator but does not polymerize in the absence thereof. In addition, the hydrophilic liquid (d) preferably contains no photopolymerization initiator which is sensitive to the actinic rays to be used. Even when the hydrophilic liquid (d) contains a photopolymerization initiator, the above requirement can be met by incorporating a polymerization inhibitor or a chain transfer agent together with the initiator.

If the hydrophilic compound (c) having one or more polymerizable unsaturated double bonds is a compound which upon irradiation with actinic rays polymerizes in the hydrophilic liquid (d) except at the interface between the liquid (d) and a shape (b) formed from the hydrophobic photopolymerizable composition, use of this hydrophilic compound (c) is undesirable in that the efficiency of utilization of the hydrophilic compound (c) having one or more polymerizable unsaturated double bonds is reduced because hydrophilic polymers not bonded to the surface of the base material are yielded in an increased amount, and that the hydrophilic liquid (d) should be more frequently replaced with a fresh one and this tends to result in a reduced production efficiency.

Whether a hydrophilic compound (c) having one or more polymerizable unsaturated double bonds polymerizes in the absence of a photopolymerization initiator or not depends also on the actinic rays with which the compound (c) is irradiated. It is possible to prevent a hydrophilic compound (c) having one or more polymerizable unsaturated double bonds from polymerizing in the absence of a photopolymerization initiator by using actinic rays selected with respect to wavelength and intensity.

Examples of the hydrophilic groups possessed by the hydrophilic compound (c) having one or more polymerizable unsaturated double bonds include nonionic hydrophilic groups such as polyethylene glycol groups, polyoxymethylene groups, a hydroxy group, saccharide-containing groups, an amide group, and a pyrrolidone group; anionic hydrophilic groups such as a carboxyl group, a sulfo group, and a phosphate group; cationic hydrophilic groups such as an amino group, an ammonium group, and a phosphonium group; and amphoteric ionic groups such as amino acid-containing groups and groups each comprising a combination of a phosphate group and an ammonium ion group. Derivatives of these groups are, of course, possible. Examples of the derivatives include N-substituted amino, amide, ammonium, and pyrrolidone groups.

The hydrophilic compound (c) having one or more polymerizable unsaturated double bonds may have one or more hydrophilic groups in the molecule, and may have one or more kinds of hydrophilic groups.

The hydrophilic compound (c) having one or more polymerizable unsaturated double bonds is preferably miscible, in any proportion, with water or with a mixed solvent comprising water and a water-soluble organic solvent. The compound (c) is more preferably miscible with water in any proportion.

Examples of the hydrophilic compound (c) having one or more polymerizable unsaturated double bonds include monomers having one or more hydroxyl groups, such as 2-hydroxyethyl (meth)acrylate, 2-hydroxypropyl (meth)acrylate, and glycerol mono(meth)acrylate; monomers having a polyethylene glycol structural unit, such as diethylene glycol mono(meth)acrylate, triethylene glycol mono(meth)acrylate, tetraethylene glycol mono(meth)acrylate, nonaethylene glycol mono(meth)acrylate, tetradecaethylene glycol mono(meth)acrylate, trieicosaethylene glycol mono(meth)acrylate, polyethylene glycol mono(meth)acrylate, methoxydiethylene glycol (meth)acrylate, methoxytriethylene glycol (meth)acrylate, methoxytetraethylene glycol (meth)acrylate, methoxynonaethylene glycol (meth)acrylate, methoxytetradecaethylene glycol (meth)acrylate, methoxytrieicosaethylene glycol (meth)acrylate, methoxypolyethylene glycol (meth)acrylate, phenoxydiethylene glycol (meth)acrylate, phenoxytetraethylene glycol (meth)acrylate, phenoxyhexaethylene glycol (meth)acrylate, phenoxynonaethylene glycol (meth)acrylate, and phenoxypolyethylene glycol (meth)acrylate; monomers having an amide group, such as N-ethyl(meth)acrylamide, N-n-propyl(meth)acrylamide, N-isopropyl(meth)acrylamide, N-cyclopropyl (meth)acrylamide, N-methyl-N-ethyl(meth)-acrylamide, N,N-dimethyl(meth)acrylamide, N,N-diethyl(meth) acrylamide, N-methyl-N-isopropyl(meth)-acrylamide, N-methyl-N-n-propyl(meth)acrylamide, N-(meth) acryloylmorpholine, N-(meth)acryloylpyrrolidine, N-(meth) acryloylpiperidine, N-vinyl-2-pyrrolidone, N-methylenebisacrylamide, N-methoxypropyl(meth) acrylamide, N-isopropoxypropyl(meth)acrylamide, N-ethoxypropyl(meth)-acrylamide, N-1-methoxymethylpropyl(meth)acrylamide, N-methoxyethoxypropyl(meth)acrylamide, N-1-methyl-2-methoxyethyl(meth)acrylamide, N-methyl-N-n-propyl (meth)acrylamide, and N-(1,3-dioxolan-2-yl)(meth) acrylamide; monomers having an amino group, such as N,N-dimethylaminoethyl (meth)acrylate, N,N-dimethylaminopropyl(meth)acrylamide, N,N-bis (methoxymethyl)carbamyloxyethyl methacrylate, and N-methoxymethylcarbamyloxyethyl methacrylate; monomers having one or more carboxyl groups, such as 2-(meth) acryloyloxyethylphthalic acid, 2-(meth) acryloyloxypropylphthalic acid, and 2-(meth) acryloyloxyethylsuccinic acid; monomers having a phosphate group, such as mono(2-methacryloyloxyethyl) acid phosphate and mono(2-acryloyloxyethyl) acid phosphate; monomers having a quaternary ammonium salt group, such as (meth)acryloyloxyethyltrimethylammonium chloride and (meth)acryloyloxypropyltrimethylammonium chloride; monomers having a sulfo group, such as 2-acrylamido-2-methylpropanesulfonic acid, 2-acrylamido-2-phenylpropanesulfonic acid, sodium (meth) acryloyloxyethylsulfonate, ammonium (meth) acryloyloxyethylsulfonate, allylsulfonic acid, methallylsulfonic acid, vinylsulfonic acid, styrenesulfonic acid, and sodium sulfonate ethoxymethacrylates; and polymerizable oligomers containing any of these hydrophilic groups and having a molecular weight of from 500 to 50,000.

From the standpoint of forming a thin hydrophilic surface layer on the surface of a shape (b), the hydrophilic compound (c) having one or more polymerizable unsaturated double bonds for use in the hydrophilic liquid (d) is preferably a compound having one polymerizable unsaturated double bond per molecule. From the standpoint of forming a relatively thick hydrophilic surface layer on the surface of a shape (b), the hydrophilic compound (c) having one or more polymerizable unsaturated double bonds for use in the hydrophilic liquid (d) is preferably a compound having two or more polymerizable unsaturated double bonds per molecule.

A (meth)acrylic monomer and/or oligomer each having amino acid structure in the molecule can be used as the hydrophilic compound (c) having one or more polymerizable unsaturated double bonds. The term "having amino acid structure in the molecule" as used herein means that the molecule contains amino acid structure bonded thereto by covalent bonding. Examples of the amino acid structure include those derived from tryptophane, alanine, isoleucine, leucine, methionine, phenylalanine, proline, valine, arginine, asparagine, aspartic acid, cysteine, cystine, glutamic acid, glutamine, glycine, histidine, hydroxylysine, hydroxyproline, lysine, serine, threonine, and tyrosine and derivatives of these. The bonding of amino acid structure to the material surface is effective not only in imparting hydrophilicity to the surface but in imparting properties such as biocompatibility and the ability to highly or selectively adsorb substances (e.g., proteins). Two or more kinds of amino acids can be simultaneously bonded to the surface; by using a suitable combination of amino acids, a new function (e.g., antithrombotic properties, selective protein adsorptivity, or optical activity) can be imparted.

A (meth)acrylic monomer and/or oligomer each having saccharide structure in the molecule can be used as the hydrophilic compound (c) having one or more polymerizable unsaturated double bonds. The term "having saccharide structure in the molecule" as used herein means that the molecule contains saccharide structure bonded thereto by covalent bonding. Examples of the saccharide include monosaccharides such as glucose, galactose, and mannose and derivatives of these (e.g., methyl glucoside) (these monosaccharides may have a cyclic (five- or six-membered ring) or chain structure), disaccharides such as maltose, cellobiose, lactose, and sucrose and derivatives of these, oligosaccharides such as cyclodextrin and derivatives of these, and polysaccharides such as starch. The bonding of saccharide structure to the material surface is preferred in that it is effective not only in imparting hydrophilicity to the surface but in reducing protein adsorptivity. Two or more kinds of saccharide structure can be simultaneously bonded to the surface; by using a combination of suitable kinds of saccharide structure or by incorporating other functional groups (e.g., sulfo groups) into the saccharide structure, a new function (e.g., antithrombotic properties, selective protein adsorptivity, or optical activity) can be imparted.

From the standpoint of facilitating the control of the amount of hydrophilic groups to be bonded, the hydrophilic liquid (d) is preferably a solution comprising a hydrophilic compound (c) having one or more polymerizable unsaturated double bonds and a solvent. The solvent is preferably water, a water-soluble solvent, a surfactant, or a mixture of these. In order to obtain a material having excellent hydrophilic surface, the solvent is more preferably water or a mixture containing water as the main component, most preferably a mixture of a surfactant and water.

The term "water-soluble solvent" means a solvent miscible with water in any proportion. Examples of the water-soluble solvent include alcohols such as methanol, ethanol, propanol, ethylene glycol, and glycerol, acids such as acetic acid, ketones such as acetone, and amides such as formamide.

Any surfactant can be optionally added to the hydrophilic liquid (d) as long as it is soluble in the solvent containing a hydrophilic compound (c) having one or more polymerizable unsaturated double bonds. Examples of the surfactant include anionic surfactants such as sodium n-dodecylbenzenesulfonate, cationic surfactants such as n-dodecyltrimethylammonium chloride, and nonionic surfactants such as polyoxyethylene sorbitan monolaurate (trade name, "Tween 20") and polyoxyethylene lauryl ether.

In the case where a hydrophilic compound (c) having one or more polymerizable unsaturated double bonds is used as a solution, the concentration thereof in the hydrophilic liquid (d) is preferably from 0.5 to 50% by weight, more preferably from 3 to 30% by weight, from the standpoints of the hydrophilicity required of a material surface, reactivity at an interface, the control of the amount of hydrophilic groups to be bonded, and cleanability after reaction.

In general, the higher the concentration of a hydrophilic compound (c) having one or more polymerizable unsaturated double bonds in the hydrophilic liquid (d), the thicker the hydrophilic layer fixed to the surface of the base material. However, if the hydrophilic layer has too large a thickness (e.g., 10 $\mu$m or larger on a dry basis), the base material in a wet state has a reduced surface strength and is apt to suffer the deformation or peeling of the hydrophilic layer. By regulating the concentration of a hydrophilic compound (c) having one or more polymerizable unsaturated double bonds in the hydrophilic liquid (d) to a value in the range specified above, a hydrophilic material can be obtained which shows sufficient hydrophilicity and has a hydrophilic surface layer not excessively thick.

According to the processes of the present invention, by using a hydrophilic compound (c) comprising at least one hydrophilic monomer, not only hydrophilicity can be imparted to the surface of a material, but also various substituents such as hydroxyl, saccharide-containing, carboxyl, phosphate, sulfo, amino, amide, quaternary ammonium salt, and amino acid-containing groups and halogens can be easily incorporated onto the material surface. It is possible to modify an enzyme, simulated antigen, antibody, saccharide, or another substance and immobilize the same to the material surface through those substituents. It is also possible to simultaneously incorporate not one kind but two or more kinds of substituents onto the surface of the same material. By regulating these substituents with respect to the kind and incorporation amount thereof, etc., it is possible to control, in a wide range, the hydrophilicity, anti-fouling properties, protein adsorptivity, biocompatibility, and other properties required of the surface of a material.

For contacting an uncured shape (b) formed from the hydrophobic photopolymerizable composition with the hydrophilic liquid (d), any method may be used. Examples of the contacting method include to immerse the shape (b) in the hydrophilic liquid (d), to cast or spray the hydrophilic liquid (d) on the surface of the shape (b), to contact the shape (b) with a foam of the hydrophilic liquid (d), and to coextrude the hydrophobic photopolymerizable composition and the hydrophilic liquid (d). Preferred among these methods is to immerse the shape (b) in the hydrophilic liquid (d).

The uncured shape (b) obtained by forming the hydrophobic photopolymerizable composition is irradiated with light while keeping the shape (b) in contact with the hydrophilic liquid (d). Upon the irradiation, an active substance, such as radicals, anions, or cations, generates within the shape (b) or on the surface thereof and causes the hydrophobic compound (a) having two or more polymerizable unsaturated double bonds to polymerize. The active substance generated or the active substance present on polymer chains formed by the polymerization of the hydrophobic compound (a) having two or more polymerizable unsaturated double bonds induces, on the surface of the shape (b), the polymerization of the hydrophilic compound (c) having one or more polymerizable unsaturated double bonds which is contained in the hydrophilic liquid (d). These polymerization reactions, which have thus begun with one active substance, end substantially in a moment. These polymerization reactions include: the homopolymerization of the hydrophobic compound (a) having two or more polymerizable unsaturated double bonds which occurs within the shape (b); the copolymerization of the hydrophobic compound (a) having two or more polymerizable unsaturated double bonds with the hydrophilic compound (c) having one or more polymerizable unsaturated double bonds which occurs at the interface between the shape (b) and the hydrophilic liquid (d); and the homopolymerization of the hydrophilic compound (c) having one or more polymerizable unsaturated double bonds which occurs in the hydrophilic liquid (d) in its part close to that interface. As a result, a block copolymer of the hydrophobic compound (a) having two or more polymerizable unsaturated double bonds and the hydrophilic compound (c) having one or more polymerizable unsaturated double bonds is formed. Consequently, neither the hydrophilic compound (c) having one or more polymerizable unsaturated double bonds nor its polymer is present inside the base material formed by curing the shape (b), and the compound (c) or its polymer is bonded only to the surface of the base material. The amount of the hydrophilic groups bonded to the surface of the base material [i.e., the amount of the polymer formed from the hydrophilic compound (c) having one or more polymerizable unsaturated double bonds] can be regulated by controlling the concentration of the hydrophilic compound (c) having one or more polymerizable unsaturated double bonds, reaction temperature, the concentration of a photopolymerization initiator in the hydrophobic photopolymerizable composition, light intensity, etc. The hydrophilic compound (c) having one or more polymerizable unsaturated double bonds which has been fixed to the surface of the base material can be present not as a polymer but as monomeric molecules.

In the processes of the present invention, part of the hydrophilic compound (c) having one or more polymerizable unsaturated double bonds used is bonded to the surface of the base material obtained by curing the shape (b) of the hydrophobic photopolymerizable composition, while the remainder thereof remains uncured in the hydrophilic liquid (d).

The hydrophilic material obtained by the present invention is not particularly limited in shape, as long as it can be produced through light irradiation. For example, the material may be in the form of a fiber, hollow fiber, tube, cylinder, particle, capsule, film, plate, or coating film, or in any other form. From the standpoint of easiness of material operation, the hydrophilic material is preferably in the form of a film or coating film. The hydrophilic material may be in a form united to a substrate or another material. The hydrophilic material may be a homogeneous material, a porous material, or a patterned material, or may have another structure.

A porous material may be produced, for example, as follows. A hydrophobic photopolymerizable composition containing a hydrophobic compound (a) having two or more polymerizable unsaturated double bonds per molecule and an ingredient which is miscible with the hydrophobic compound (a) but is inmiscible with a cured polymer to be formed from the hydrophobic compound (a) is formed. (That ingredient is called a poor solvent or a phase separator; hereinafter referred to as "poor solvent".) The resultant shape is polymerized and cured, e.g., by conducting precure, which will be described later. Thereafter, the poor solvent is removed to obtain a porous material. Since the hydrophobic compound (a) having two or more polymerizable unsaturated double bonds per molecule becomes inmiscible with the poor solvent upon polymerization, phase separation occurs and the shape solidifies to form a network structure. This cured shape is washed to remove the poor solvent. Thus, a porous material having interconnected pores can be obtained.

Examples of the poor solvent include alkyl esters of fatty acids, such as diisobutyl adipate, methyl caprylate, methyl caprate, and methyl laurate; ketones such as diisobutyl ketone; and nonionic surfactants such as polyethylene glycol monolaurate and polyethylene glycol monolauryl ether.

Methods for forming the hydrophobic photopolymerizable composition are not particularly limited. Examples thereof include coating with a coater or by spraying, extrusion through a nozzle, and casting into a mold. In the case where the hydrophobic photopolymerizable composition is to be applied thinly and evenly or applied to an object of a complicated shape or a porous material (e.g., a microporous membrane) or to a surface of a nonwoven or woven fabric (including micropores and fiber surfaces), use may be made of a method comprising dissolving the hydrophobic photopolymerizable composition in a solvent, applying the solution by coating, spraying, or dipping, subsequently optionally removing the excess solution, and then evaporating the solvent. Any solvent may be used for this method as long as the hydrophobic photopolymerizable composition can dissolve therein. However, a relatively highly volatile solvent is preferred from the standpoint of the necessity of drying the shape after coating. Examples of such a solvent include alcohols such as methanol, ethanol, 1-propanol, and 2-propanol; ketones such as acetone and methyl ethyl ketone; ethers such as diethyl ether; esters such as ethyl acetate; hydrocarbons such as hexane and toluene; and chlorinated solvents such as dichloromethane and dichloroethane.

After the hydrophobic photopolymerizable composition is formed, the shape (b) may be preliminarily cured by irradiation with light. If the hydrophobic photopolymerizable composition has a low viscosity, the shape (b) of the hydrophobic photopolymerizable composition may be less apt to retain its shape when in contact with the hydrophilic liquid (d) containing a hydrophilic compound (c) having one or more polymerizable unsaturated double bonds. In this case, use may be made of a method comprising precuring (incompletely curing) the shape (b) beforehand with actinic rays, bringing the precured shape into contact with the hydrophilic liquid (d), and then conducting irradiating with light. This method is preferred in that the shape (b) comes to have improved surface smoothness. If the shape (b) is precured excessively, the amount of hydrophilic groups which can be incorporated onto the material surface is too small. It is therefore necessary to conduct the precure to such a degree that polymerizable unsaturated double bonds of the hydrophobic photopolymerizable composition remain in a sufficient amount. The optimal conditions therefor can be determined through a simple experiment. Although the precure may be conducted in a nitrogen atmosphere for a short time, the shape is preferably incompletely cured for a short time in air, in which the hydrophobic photopolymerizable composition does not polymerize completely, i.e., the polymerization of the composition is apt to be inhibited.

Examples of the actinic rays used in the processes of the present invention include ultraviolet rays, visible rays, and infrared rays. Preferred among these actinic rays from the standpoint of the rate of polymerization/curing are ultraviolet rays and visible rays, in particular ultraviolet rays. If ultraviolet rays having too short a wavelength are used, a larger number of compounds having one or more polymerizable unsaturated double bonds undesirably polymerize even in the absence of a photopolymerization initiator, so that a hydrophilic compound (c) having one or more polymerizable unsaturated double bonds should be selected from a narrower range. Consequently, it is preferred to use actinic rays having a main wavelength of 300 nm or longer, in particular 350 nm or longer. Energy rays such as electron beams, X rays, or y rays are usable besides actinic rays. However, actinic rays are most preferably used from the standpoint of diminishing the amount of polymers of a hydrophilic compound (c) having one or more polymerizable unsaturated double bonds which polymers are not bonded to the base material. The intensity of the actinic rays with which the shape is irradiated is preferably from 1 to 5,000 mW/cm$^2$, more preferably from 10 to 2,000 mW/cm$^2$. For the purpose of heightening the rate of polymerization/curing to complete the polymerization, the light irradiation is preferably conducted in an inert gas atmosphere. The dissolved oxygen is preferably removed beforehand from the hydrophilic liquid (d) containing a hydrophilic compound (c) having one or more polymerizable unsaturated double bonds. It is also preferred to remove the dissolved oxygen beforehand from the hydrophobic photopolymerizable composition containing a hydrophobic compound (a) having two or more polymerizable unsaturated double bonds.

The photopolymerization is not particularly limited in temperature. In a range up to about 70° C., higher temperatures are preferred in that a material having higher hydrophilicity is obtained. When operational conditions also are taken in account, temperatures in the range of about from room temperature to about 50° C. are preferred. Curing by light irradiation may, of course, be conducted batch-wise or continuously. In the case where curing by light irradiation is conducted batch-wise, use may be made of a method in which a shape obtained is immediately precured by irradiation with light, and the resultant precured material is completely cured by irradiation with light while keeping the precured material in contact with the hydrophilic liquid (d) containing a hydrophilic compound (c) having one or more polymerizable unsaturated double bonds.

In the case where the unreacted reactants, polymerization initiator, etc. should be removed from the material after polymerization/curing as in the case where the base material is a porous material, the removal can be accomplished by washing, drying, suction, replacement, etc. After the removal of those residual substances, the material can be irradiated with ultraviolet rays (postcuring). A heat treatment can be conducted after curing by light irradiation or after the removal of residual substances to thereby completely remove the unreacted monomers and the residual solvent.

That a hydrophilic layer has been formed on the surface of a base material according to the present invention can be judged by ascertaining a decrease in contact angle between the surface and water. The material having hydrophilic surface produced by the processes of the present invention preferably has a contact angle with water smaller by at least 5 degrees than that of the material on which the hydrophilic layer has not been formed. For use in applications in which the material having hydrophilic surface is required not to adsorb hydrophobic substances, the hydrophilic material desirably has a contact angle with water smaller than that of the corresponding untreated hydrophobic material by degrees as much as possible, preferably by at least 10 degrees, more preferably by at least 20 degrees. In this case, the contact angle of the material having hydrophilic surface according to the present invention with water is preferably as small as possible, specifically, preferably 45 degrees or smaller, more preferably 30 degrees or smaller, most preferably 10 degrees or smaller. However, for use in applications in which a function such as selective adsorptivity or biocompatibility is desired, it is not always true that the smallest possible contact angle with water is preferred.

The hydrophilic layer of the material having hydrophilic surface produced by the present invention can have a thickness of 100 μm or smaller, preferably 30 μm or smaller, more preferably 10 μm or smaller, on a dry basis. The lower limit of thickness of the hydrophilic layer need not be particularly specified, because it depends on the size of molecules. If the thickness of the hydrophilic layer is larger than the upper limit, the layer is apt to peel off the surface due to a dimensional change upon swelling. The hydrophilic layer can be designed to have a suitable thickness within the above range according to the intended use. The hydrophilic layer need not cover the whole surface of the base material. For example, the base material surface may have minute uncovered parts of about the molecular size. The hydrophilic layer may also have a structure formed by photolithography or another technique so that only the necessary parts of the surface of the base material are covered therewith.

In the material having hydrophilic surface obtained by the processes of the present invention, the hydrophilic compound (c) is present substantially only on the surface of the base material, and the compound (c) has been bonded thereto chemically. Substantially no hydrophilic compound (c) is present inside the base material, for example, as a copolymer or a blend. In the case where the base material is a porous material, the term "inside of the base material" means the inside of the polymer constituting the base material, and the surfaces of the pores are regarded as part of the surface of the base material. Since the base material is made of a polymer different from that constituting the hydrophilic surface layer, it does not suffer a property decrease especially in a wet state.

The present invention will be explained below in more detail by reference to Examples and Comparative Examples, but the invention should not be construed as being limited to the scope of these Examples. In the following Examples, all "parts" and "percents" are by weight unless otherwise indicated.

Definition of Examination Items

For examining the materials having hydrophilic surface obtained in the following Examples and Comparative Examples, the following methods were used.

(1) Measurement of Water Contact Angle

The contact angle between a material having hydrophilic surface and water was measured with contact angle meter Type CA-D, manufactured by Kyowa Science K.K., Japan, based on the droplet method.

(2) Elemental Analysis of Material Surface

The elemental analysis of a hydrophilized material surface was conducted by photoelectronic spectroscopy using X-ray excitation (ESCA). The results obtained for each sample are given in terms of elemental composition to show the relative number of atoms of each element. The analysis was conducted with X-ray photoelectron analyzer Type ESCA 850, manufactured by Shimadzu Corp., Japan, under the conditions of an angle between the material surface and the photoelectron detector (θ) of 15°.

EXAMPLE 1

Ninety-eight parts of "Kayarad R-684" (dicyclopentanyl diacrylate; manufactured by Nippon Kayaku Co., Ltd., Japan) was homogeneously mixed with 2 parts of "Irgacure 184" (photopolymerization initiator manufactured by Ciba-Geigy Ltd.) to obtain hydrophobic photopolymerizable composition (A-1).

On the other hand, 1 part of "Lightester DQ-75" (quaternized dimethylaminoethyl methacrylate; monomer having a hydrophilic group manufactured by Kyoeisha Chemical Co., Ltd., Japan) was homogeneously mixed with 99 parts of distilled water to obtain hydrophilic liquid (D-1).

Hydrophobic photopolymerizable composition (A-1) was applied to a glass plate with a coater in a thickness of 250 μm. The coated glass plate was placed in hydrophilic liquid (D-1), immediately irradiated with 100 mW/cm$^2$ ultraviolet rays for 40 seconds, and then taken out. The cured film thus obtained was immersed in ethanol for 20 minutes, subsequently rinsed with running water for 1 hour, and then air-dried overnight to obtain a material having hydrophilic surface in a coating film form.

The surface of the material having hydrophilic surface was subjected to the measurement of water contact angle and elemental analysis. The results obtained are shown in Table 1. The hydrophilic surface layer of the material having hydrophilic surface obtained above had a thickness not larger than 10 μm. As shown in Comparative Examples 1 and 2, the base material of the above-obtained material having hydrophilic surface did not swell in 20° C. water.

The hydrophilic monomer used in this Example ("Lightester DQ-75") had an element ratio of C:O:N= 75:18:8. The closer the results of elemental analysis of the hydrophilic monomer to the results of elemental analysis of the material surface, the larger the amount of hydrophilic groups (the amount of the hydrophilic monomer) bonded to the material surface and the higher the imparted hydrophilic surface.

Even when hydrophilic liquid (D-1) was irradiated with 100 mW/cm$^2$ ultraviolet rays for 40 seconds, neither a cured substance nor a gel precipitated from the hydrophilic liquid (D-1). This hydrophilic liquid (D-1) was analyzed by gel permeation chromatography (GPC). As a result, the concentration of the hydrophilic monomer in the hydrophilic liquid (D-1) was found to be almost the same as the initial value, showing that the amount of a polymer yielded was negligible.

EXAMPLE 2

Five parts of "Lightester DQ-75" (quaternized dimethylaminoethyl methacrylate) was homogeneously mixed with 95 parts of distilled water to obtain hydrophilic liquid (D-2).

A material having hydrophilic surface in a coating film form was produced in the same manner as in Example 1, except that hydrophilic liquid (D-2) was used in place of hydrophilic liquid (D-1). The surface of the material was subjected to the measurement of water contact angle and elemental analysis. The results obtained are shown in Table 1. The hydrophilic surface layer of the material having hydrophilic surface obtained above had a thickness not larger than 10 $\mu$m.

Even when hydrophilic liquid (D-2) was irradiated with 100 mW/cm$^2$ ultraviolet rays for 40 seconds, neither a cured substance nor a gel precipitated from the aqueous solution. This hydrophilic liquid (D-2) was analyzed by GPC. As a result, the concentration of the hydrophilic monomer in the hydrophilic liquid (D-2) was found to be almost the same as the initial value, showing that the amount of a polymer yielded was negligible.

EXAMPLE 3

Ten parts of "Lightester DQ-75" (quaternized dimethylaminoethyl methacrylate) was homogeneously mixed with 90 parts of distilled water to obtain hydrophilic liquid (D-3).

Subsequently, the photopolymerizable composition (A-1) used in Example 1 was applied to a glass plate with a coater in a thickness of 250 $\mu$m. The resultant coating was preliminarily irradiated in air with 100 mW/cm$^2$ ultraviolet rays for 3 seconds. Thereafter, the coated glass plate was placed in hydrophilic liquid (D-3), irradiated with 100 mW/cm$^2$ ultraviolet rays for 40 seconds, and then taken out. The cured film thus obtained was immersed in ethanol for 20 minutes, subsequently rinsed with running water for 1 hour, and then air-dried overnight to obtain a material having hydrophilic surface in a coating film form (Example 3-1). Furthermore, materials having hydrophilic surface were produced in the same manner as in Example 3-1, except that the hydrophilic liquid (D-3) of which the glass plate coated with the material having hydrophilic surface produced by the method described above had been taken out was reused repeatedly. Thus, five materials having hydrophilic surface were produced in total. The materials thus produced were subjected to the same treatment as the material having hydrophilic surface produced in Example 3-1.

The surface of each of the first (Example 3-1) and the fifth (Example 3-2) materials having hydrophilic surface thus obtained was subjected to the measurement of water contact angle and elemental analysis. The results obtained are shown in Table 1. The hydrophilic surface layers of the materials having hydrophilic surface obtained above each had a thickness not larger than 10 $\mu$m.

Even when hydrophilic liquid (D-3) was repeatedly irradiated with 100 mW/cm$^2$ ultraviolet rays for 40 seconds for each irradiation, neither a cured substance nor a gel precipitated from the hydrophilic liquid (D-3). This hydrophilic liquid (D-3) was analyzed by GPC. As a result, the concentration of the hydrophilic monomer in the hydrophilic liquid (D-3) was found to be almost the same as the initial value, showing that the amount of a polymer yielded from the hydrophilic monomer was negligible.

The above results and the fact that the first and the fifth materials had the same degree of hydrophilicity as shown in Table 1 indicate that only a part of the hydrophilic monomer present in hydrophilic liquid (D-3) was fixed to the surface of each material having hydrophilicity and the hydrophilic liquid (D-3) was repeatedly usable.

EXAMPLE 4

Ten parts of "Lightester DQ-75" (quaternized dimethylaminoethyl methacrylate) was homogeneously mixed with 89.5 parts of distilled water and 0.5 part of a surfactant [polyethylene glycol (n=10) monolaurate] to obtain hydrophilic liquid (D-4).

A material having hydrophilic surface in a coating film form was produced in the same manner as in Example 1, except that hydrophilic liquid (D-4) was used in place of hydrophilic liquid (D-1). The surface of the material was subjected to the measurement of water contact angle and elemental analysis. The results obtained are shown in Table 1. The hydrophilic surface layer of the material having hydrophilic surface obtained above had a thickness not larger than 10 $\mu$m.

Even when hydrophilic liquid (D-4) was irradiated with 100 mW/cm$^2$ ultraviolet rays for 40 seconds, neither a cured substance nor a gel precipitated from the hydrophilic liquid (D-4). This hydrophilic liquid (D-4) was analyzed by GPC. As a result, the concentration of the hydrophilic monomer in the hydrophilic liquid (D-4) was found to be almost the same as the initial value, showing that the amount of a polymer yielded was negligible.

EXAMPLE 5

Ninety-eight parts of "New Frontier BPE-4" (bisphenol A diacrylate modified with diethylene oxide; manufactured by Dai-ichi Kogyo Seiyaku Co., Ltd., Japan) was homogeneously mixed with 2 parts of "Irgacure 184" (photopolymerization initiator) to obtain hydrophobic photopolymerizable composition (A-5).

On the other hand, 5 parts of "Lightester PA" [mono(2-acryloyloxyethyl) acid phosphate; hydrophilic monomer manufactured by Kyoeisha Chemical Co., Ltd.] was homogeneously mixed with 95 parts of distilled water to obtain hydrophilic liquid (D-5).

A material having hydrophilic surface in a coating film form was produced in the same manner as in Example 1, except that hydrophobic photopolymerizable composition (A-5) was used in place of hydrophobic photopolymerizable composition (A-1), and that hydrophilic liquid (D-5) was used in place of hydrophilic liquid (D-1). The surface of the material was subjected to the measurement of water contact angle and elemental analysis. The results obtained are shown in Table 1. The base material of this material having hydrophilic surface did not swell in 20° C. water. The hydrophilic surface layer of the material having hydrophilic surface obtained above had a thickness not larger than 10 $\mu$m.

The hydrophilic monomer used in this Example ("Lightester PA") had an element ratio of C:O:P=42:50:8.

Even when hydrophilic liquid (D-5) was irradiated with 100 mW/cm$^2$ ultraviolet rays for 40 seconds, neither a cured substance nor a gel precipitated from the hydrophilic liquid (D-5). This hydrophilic liquid (D-5) was analyzed by GPC. As a result, the concentration of the hydrophilic monomer in the hydrophilic liquid (D-5) was found to be almost the same as the initial value, showing that the amount of a polymer yielded was negligible.

EXAMPLE 6

Eleven parts of "DMAA" (N,N-dimethylacrylamide; hydrophilic monomer manufactured by Kohjin Co., Ltd., Japan) was homogeneously mixed with 89 parts of distilled water to obtain hydrophilic liquid (D-6).

A material having hydrophilic surface in a coating film form was produced in the same manner as in Example 1, except that hydrophobic photopolymerizable composition (A-5) used in Example 5 was used in place of hydrophobic photopolymerizable composition (A-1), and that hydrophilic liquid (D-6) was used in place of hydrophilic liquid (D-1). The surface of the material was subjected to the measurement of water contact angle and elemental analysis. The results obtained are shown in Table 1. The hydrophilic surface layer of the material having hydrophilic surface obtained above had a thickness not larger than 10 µm.

The hydrophilic monomer used in this Example ("DMAA") had an element ratio of C:O:N=72:14:14.

Even when hydrophilic liquid (D-6) was irradiated with 100 mW/cm$^2$ ultraviolet rays for 40 seconds, neither a cured substance nor a gel precipitated from the hydrophilic liquid (D-6). This hydrophilic liquid (D-6) was analyzed by GPC. As a result, the concentration of the hydrophilic monomer in the hydrophilic liquid (D-6) was found to be almost the same as the initial value, showing that the amount of a polymer yielded was negligible.

EXAMPLE 7

A material having hydrophilic surface in a coating film form was produced in the same manner as in Example 1, except that hydrophobic photopolymerizable composition (A-5) used in Example 5 was used in place of hydrophobic photopolymerizable composition (A-1), and that hydrophilic liquid (D-6) used in Example 6 was used after being heated to 50° C. in place of hydrophilic liquid (D-1). The surface of the material was subjected to the measurement of water contact angle and elemental analysis. The results obtained are shown in Table 1. The hydrophilic surface layer of the material having hydrophilic surface obtained above had a thickness not larger than 10 µm.

Even when the hydrophilic liquid (D-6) heated to 50° C. was irradiated with 100 mW/cm$^2$ ultraviolet rays for 40 seconds, neither a cured substance nor a gel precipitated from the hydrophilic liquid (D-6). This hydrophilic liquid (D-6) was analyzed by GPC. As a result, the concentration of the hydrophilic monomer in the hydrophilic liquid (D-6) was found to be almost the same as the initial value, showing that the amount of a polymer yielded was negligible.

EXAMPLE 8

(Synthesis of 6-acryloyl(1-O-)n-butyl glucoside)

A mixture of 1 part of butyl glucoside, 95 parts of methyl acrylate (containing a small amount of methoxyphenol as a polymerization inhibitor), and 1 part by weight of lipase QL (Alcalingenes sp.; manufactured by Meito Sangyo K.K., Japan) was reacted at 80° C. with stirring for 8 hours using an apparatus packed with a molecular sieve (Type 4A) as a tank for removing by-products. During the reaction, 1 part by weight each of butyl glucoside and the enzyme were added 4 times at an interval of 1 hour until 4 hours had passed since initiation of the reaction. Thus, butyl glucoside and the enzyme each was added in a total amount of 5%. Through the 8-hour reaction, 6-acryloyl(1-O-)n-butyl glucoside as the target compound was formed in a yield of 28%.

After the reaction mixture was cooled, it was filtered to remove the enzyme and the substrate remaining unreacted. Thereafter, the methyl acrylate remaining unreacted was removed under vacuum to purify the target 6-acryloyl(1-O-)n-butyl glucoside.

(Preparation of hydrophilic liquid)

Ten parts of 6-acryloyl(1-O-)n-butyl glucoside (hydrophilic monomer having saccharide structure in the molecule; hereinafter abbreviated as "ABG") was homogeneously mixed with 90 parts of distilled water to obtain hydrophilic liquid (D-8).

(Preparation of material having hydrophilic surface)

A material having hydrophilic surface in a coating film form was produced in the same manner as in Example 1, except that hydrophobic photopolymerizable composition (A-5) used in Example 5 was used in place of hydrophobic photopolymerizable composition (A-1), and that hydrophilic liquid (D-8) was used in place of hydrophilic liquid (D-1). The surface of the material was subjected to the measurement of water contact angle and elemental analysis. The results obtained are shown in Table 1. The hydrophilic surface layer of the material having hydrophilic surface obtained above had a thickness not larger than 10 µm.

The hydrophilic monomer used in this Example (6-acryloyl(1-O-)n-butyl glucoside) had an element ratio of C:O=65:35.

Even when hydrophilic liquid (D-8) was irradiated with 100 mW/cm$^2$ ultraviolet rays for 40 seconds, neither a cured substance nor a gel precipitated from the hydrophilic liquid (D-8). This hydrophilic liquid (D-8) was analyzed by GPC. As a result, the concentration of the hydrophilic monomer in the hydrophilic liquid (D-8) was found to be almost the same as the initial value, showing that the amount of a polymer yielded was negligible.

EXAMPLE 9

Ten parts of a monomer having amino acid structure and synthesized from 2-isocyanatoethyl methacrylate (MOI) and aspartic acid (Asp) (N-methacryloyloxyethylcarbamic acid-aspartic acid; hereinafter abbreviated as "MOI-Asp") was homogeneously mixed with 70 parts of 2-propanol and 30 parts of distilled water to obtain hydrophilic liquid (D-9).

A material having hydrophilic surface in a coating film form was produced in the same manner as in Example 1, except that hydrophobic photopolymerizable composition (A-5) used in Example 5 was used in place of hydrophobic photopolymerizable composition (A-1), and that hydrophilic liquid (D-9) was used in place of hydrophilic liquid (D-1). The surface of the material was subjected to the measurement of water contact angle and elemental analysis. The results obtained are shown in Table 1. The hydrophilic surface layer of the material having hydrophilic surface obtained above had a thickness not larger than 10 µm.

The hydrophilic monomer used in this Example (MOI-Asp) had an element ratio of C:O:N=55:35:10.

Even when hydrophilic liquid (D-9) was irradiated with 100 mW/cm$^2$ ultraviolet rays for 40 seconds, neither a cured substance nor a gel precipitated from the hydrophilic liquid (D-9). This hydrophilic liquid (D-9) was analyzed by GPC. As a result, the concentration of the hydrophilic monomer in the hydrophilic liquid (D-9) was found to be almost the same as the initial value, showing that the amount of a polymer yielded was negligible.

COMPARATIVE EXAMPLE 1

Hydrophobic photopolymerizable composition (A-1) used in Example 1 was applied to a glass plate with a coater in a thickness of 250 μm. The coated glass plate was placed in water, immediately irradiated with 100 mW/cm$^2$ ultraviolet rays for 40 seconds, and then taken out. The cured film thus obtained was immersed in ethanol for 20 minutes, subsequently rinsed with running water for 1 hour, and then air-dried overnight to obtain a material in a coating film form.

The surface of the thus-obtained material in a coating film form was subjected to the measurement of water contact angle and elemental analysis. The results obtained are shown in Table 1. This film-form material did not swell in 20° C. water.

COMPARATIVE EXAMPLE 2

Hydrophobic photopolymerizable composition (A-1) used in Example 1 was applied to a glass plate with a coater in a thickness of 250 μm. The resultant coating was irradiated with 100 mW/cm$^2$ ultraviolet rays in a nitrogen atmosphere for 40 seconds. The cured film thus obtained was immersed in ethanol for 20 minutes, subsequently rinsed with running water for 1 hour, and then air-dried overnight to obtain a material in a coating film form.

The surface of the thus-obtained material in a coating film form was subjected to the measurement of water contact angle and elemental analysis. The results obtained are shown in Table 1.

COMPARATIVE EXAMPLE 3

Seventy parts of "Kayarad R-684" (dicyclopentanyl diacrylate) was homogeneously mixed with 30 parts of "NK Ester AM-90G" (methoxynonaethylene glycol acrylate; hydrophilic monomer manufactured by Shinnakamura Chemical Industrial Co., Ltd., Japan) and 2 parts of "Irgacure 184" (photopolymerization initiator). Thus, photopolymerizable composition (A'-3) was obtained, which contained the hydrophilic monomer.

Photopolymerizable composition (A'-3) was applied to a glass plate with a coater in a thickness of 250 μm. The resultant coating was irradiated with 100 mW/cm$^2$ ultraviolet rays in a nitrogen atmosphere for 40 seconds. The cured film thus obtained was immersed in ethanol for 20 minutes, subsequently rinsed with running water for 1 hour, and then air-dried overnight to obtain a material in a coating film form.

The surface of the thus-obtained material in a coating film form was subjected to the measurement of water contact angle and elemental analysis. The results obtained are shown in Table 1.

The hydrophilic monomer used in this Comparative Example ("NK Ester AM-90G") had an element ratio of C:O=67:33. Photopolymerizable composition (A'-3) used in this Comparative Example was unable to be polymerized and cured in water because it underwent phase separation in water. The material obtained above swelled several times in water.

COMPARATIVE EXAMPLE 4

Seventy parts of "Kayarad R-684" (dicyclopentanyl diacrylate) was homogeneously mixed with 30 parts of "Lightester DQ-75" (quaternized dimethylaminoethyl methacrylate) and 2 parts of "Irgacure 184" (photopolymerization initiator). Thus, photopolymerizable composition (A'-4) was obtained, which contained the hydrophilic monomer.

Photopolymerizable composition (A'-4) was applied to a glass plate with a coater in a thickness of 250 μm. The resultant coating was irradiated with 100 mW/cm$^2$ ultraviolet rays in a nitrogen atmosphere for 40 seconds. The cured film thus obtained was immersed in ethanol for 20 minutes, subsequently rinsed with running water for 1 hour, and then air-dried overnight to obtain a material in a coating film form.

The surface of the thus-obtained material in a coating film form was subjected to the measurement of water contact angle and elemental analysis. The results obtained are shown in Table 1.

Photopolymerizable composition (A'-4) used in this Comparative Example was unable to be polymerized and cured in water because it underwent phase separation in water. The material obtained above swelled several times in water.

COMPARATIVE EXAMPLE 5

To 100 parts of hydrophilic liquid (D-3) used in Example 3 was added 2 parts of "Darocur 953" (photopolymerization initiator manufactured by Merck). Thus, hydrophilic liquid (D'-2) was obtained.

Five materials having hydrophilic surface each in a coating film form were produced in the same manner as in Example 3, except that hydrophilic liquid (D'-2) was used in place of hydrophilic liquid (D-3). The first (Comparative Example 5-1) and the fifth (Comparative Example 5-2) materials were subjected to the measurement of water contact angle and surface elemental analysis. The results obtained are shown in Table 1. The thickness of the hydrophilic surface layer of each of the thus-obtained materials having hydrophilic surface was too small (not larger than 1 μm) to be determined through an examination of a thickness-direction section of the coating film with a scanning electron microscope.

A comparison between Example 3 and this Comparative Example shows the following. Use of the hydrophilic liquid containing a photopolymerization initiator give materials having reduced hydrophilic surface. In addition, as the number of materials produced with the hydrophilic liquid increases, the degree of hydrophilic surface becomes lower.

Hydrophilic liquid (D'-2) was irradiated with 100 mW/cm$^2$ ultraviolet rays for 40 seconds and then examined by GPC. As a result, it was ascertained that about 35% of the hydrophilic monomer contained in the hydrophilic liquid (D'-2) had changed into an oligomer having an average molecular weight of about 3,000. Namely, a large proportion of the hydrophilic compound was consumed through polymerization without being bonded to the base material. It is therefore apparent that hydrophilic liquid (D'-2) was unable to be used repeatedly.

COMPARATIVE EXAMPLE 6

A material in a coating film form was obtained in the same manner as in Example 3-1, except that irradiation with ultraviolet rays was conducted in a nitrogen atmosphere for 40 seconds.

The surface of the thus-obtained material in a coating film form was subjected to the measurement of water contact angle and elemental analysis. The results obtained are shown in Table 1.

The surface state of the material obtained in Comparative Example 6 was almost the same as that of the material obtained in Comparative Example 2, in which curing was conducted in a nitrogen stream only. It is apparent from the above results that when precuring is conducted to such a degree as to completely cure the hydrophobic photopolymerizable composition (A), the surface of the material in a coating film form finally obtained remains unhydrophilized.

Subsequently, a nozzle having a core extrusion opening disposed at the center and having a diameter of 2 mm and a circular extrusion opening disposed outside the core extrusion opening and having an inner diameter of 5 mm and a slit width of 1.5 mm was used to extrude, in air, photopolymerizable composition (A-10) through the core extrusion open-

TABLE 1

| Item | Material Surface | | Hydrophilic Compound (c) | |
|---|---|---|---|---|
| | Contact angle with water | Element ratio | Kind | Element ratio |
| Example 1 | 63° | C:O:N = 79:19:2 | Lightester DQ-75 | C:O:N = 75:17:8 |
| Example 2 | 40° | C:O:N = 78:19:3 | Lightester DQ-75 | C:O:N = 75:17:8 |
| Example 3 | | | | |
| 3-1 | 8° | C:O:N = 75:20:5 | Lightester DQ-75 | C:O:N = 75:17:8 |
| 3-2 | 8° | C:O:N = 75:20:5 | Lightester DQ-75 | C:O:N = 75:17:8 |
| Example 4 | 4° | C:O:N = 75:19:6 | Lightester DQ-75 | C:O:N = 75:17:8 |
| Example 5 | 5° | C:O:P = 50:43:7 | Lightester PA | C:O:P = 42:50:8 |
| Example 6 | 54° | C:O:N = 77:18:5 | DMAA | C:O:N = 72:14:14 |
| Example 7 | 24° | C:O:N = 74:13:13 | DMAA | C:O:N = 72:14:14 |
| Example 8 | 10° | C:O:N = 69:31:0 | ABG | C:O:N = 65:35:0 |
| Example 9 | 49° | C:O:N = 76:21:3 | MOI-Asp | C:O:N = 55:35:10 |
| Comparative Example 1 | 70° | C:O:N = 81:19:0 | — | — |
| Comparative Example 2 | 76° | C:O:N = 82:18:0 | — | — |
| Comparative Example 3 | 69° | C:O:N = 79:21:0 | NK Ester AM-90G | C:O:N = 67:33:0 |
| Comparative Example 4 | 15° | C:O:N = 75:19:6 | Lightester DQ-75 | C:O:N = 75:17:8 |
| Comparative Example 5 | | | | |
| 5-1 | 52° | C:O:N = 78:18:4 | Lightester DQ-75 | C:O:N = 75:17:8 |
| 5-2 | 69° | C:O:N = 80:19:1 | Lightester DQ-75 | C:O:N = 75:17:8 |
| Comparative Example 6 | 75° | C:O:N = 82:18:0 | Lightester DQ-75 | C:O:N = 75:17:8 |

In the Table, ABG means 6-acryloyl(1-O)n-butyl glucoside, and MOI-Asp means N-methacryloyloxyethylcarbamic acid-aspartic acid.

The results for Examples 1 to 3 given in Table 1 show that as the concentration of the hydrophilic monomer (Lightester DQ-75) in hydrophilic liquid (d) is increased, the results of elemental analysis of the material surface become close to the element ratio of the hydrophilic monomer, i.e., the amount of hydrophilic groups bonded to the material surface increases. As a result, the material surface comes to have significantly enhanced hydrophilicity and a reduced contact angle with water.

The results for Examples 3 and 4 given in Table 1 show that by incorporating a surfactant into hydrophilic liquid (d), a surface having higher hydrophilicity can be obtained. Furthermore, the results for Examples 6 and 7 given in Table 1 show that by using a higher temperature to conduct polymerization/curing, a larger amount of hydrophilic groups can be bonded to the material surface.

EXAMPLE 10

Seventy-five parts of a urethane acrylate oligomer having three acryloyl groups per molecule on the average (trade name, "Unidic V-4263"; manufactured by Dainippon Ink & Chemicals, Inc., Japan) were homogeneously mixed with 25 parts of dicyclopentanyl diacrylate (trade name, "Kayarad R-684"; manufactured by Nippon Kayaku Co., Ltd.) and 2 parts of "Irgacure 184" (photopolymerization initiator) to obtain hydrophobic photopolymerizable composition (A-10).

ing at a rate of 18 ml/min and simultaneously extrude hydrophilic liquid (D-3) used in Example 3 through the circular extrusion opening at a rate of 25 ml/min. The resultant extrudate consisted of the photopolymerizable composition (A-10) in a fiber form whose external surface was in contact with the hydrophilic liquid (D-3). At the time when the extrudate, which was descending from the nozzle, had reached to the range of from 30 to 60 cm in terms of distance from the nozzle, it was irradiated with ultraviolet rays at an intensity of 1,200 mW/cm$^2$. Thereafter, the extrudate was immersed in ethanol for 20 minutes, subsequently rinsed with running water for 1 hour, and then air-dried overnight. Thus, a fiber-form material having hydrophilic surface and a diameter of 1.6 mm was obtained.

The surface of the thus-obtained material having hydrophilic surface was subjected to the measurement of water contact angle and elemental analysis. The results obtained are shown in Table 2. The hydrophilic surface layer of the material having hydrophilic surface obtained above had a thickness not larger than 10 $\mu$m.

EXAMPLE 11

A nozzle having a central slit-form extrusion opening disposed at the center and having a slit width of 1.0 mm and a length of 25 mm and a nearly elliptic extrusion opening disposed outside the central opening and having a slit width of 1.5 mm, a major axis length of 30 mm, and a minor axis length of 5 mm was used to extrude, in air, photopolymerizable composition (A-10) used in Example 10 through the central slit-form extrusion opening at a rate of 18 ml/min and simultaneously extrude hydrophilic liquid (D-3) used in Example 3 through the nearly elliptic extrusion opening at a rate of 30 ml/min. The resultant extrudate consisted of the photopolymerizable composition (A-10) in a tape form whose external surface was in contact with the hydrophilic liquid (D-3). At the time when the extrudate, which was descending from the nozzle, had reached to the range of from 30 to 60 cm in terms of distance from the nozzle, it was irradiated with ultraviolet rays at an intensity of 1,200 mW/cm$^2$. Thereafter, the extrudate was immersed in ethanol for 20 minutes, subsequently rinsed with running water for 1 hour, and then air-dried overnight. Thus, a tape-form material having hydrophilic surface was obtained which had a width of 20 mm and a thickness of 0.8 mm.

The surface of the thus-obtained material having hydrophilic surface was subjected to the measurement of water contact angle and elemental analysis. The results obtained are shown in Table 2. The hydrophilic surface layer of the material having hydrophilic surface obtained above had a thickness not larger than 10 μm.

EXAMPLE 12

Hydrophobic photopolymerizable composition (A-12) was obtained by homogeneously mixing 67.5 parts of "Unidic V-4263 (urethane acrylate oligomer having three acryloyl groups per molecule on the average; manufactured by Dainippon Ink & Chemicals, Inc.), 22.5 parts of "Kayarad R-684" (dicyclopentanyl diacrylate), 10 parts of "NK Ester AM-90G" (methoxynonaethylene glycol acrylate; hydrophilic monomer manufactured by Shinnakamura Chemical Industrial Co., Ltd.), 180 parts of methyl caprate (poor solvent), and 4 parts of "Irgacure 184" (photopolymerization initiator).

Subsequently, photopolymerizable composition (A-12) was extruded, in air, through a cylindrical nozzle having an inner diameter of 0.16 mm into particles at a rate of 22 ml/min. At the time when the extruded particles, which were falling from the nozzle, had reached to the range of from 30 to 60 cm in terms of distance from the nozzle, they were irradiated with ultraviolet rays at an intensity of 1,200 mW/cm$^2$ to obtain milk-white precured beads. The precured beads were placed in a beaker containing hydrophilic liquid (D-3) used in Example 3, and then irradiated from over the beaker with ultraviolet rays at an intensity of 100 mW/cm$^2$ for 40 seconds. Thus, the precured beads were photopolymerized and cured to obtain cured beads having a diameter of 0.45 mm.

The beads thus obtained were immersed in ethanol for 60 minutes, subsequently rinsed with running water for 3 hours, and then air-dried overnight to obtain white porous beads having a diameter of 0.4 mm.

The surface of the porous beads thus obtained was subjected to the measurement of water contact angle and elemental analysis. Because of the porosity of the bead surface, water infiltrated into pores and, hence, the contact angle with water was unable to be measured. The results of the elemental analysis obtained are shown in Table 2. The hydrophilic surface layer of the material having hydrophilic surface obtained above had a thickness not larger than 10 μm.

EXAMPLE 13

A nozzle having a core extrusion opening disposed at the center and having a diameter of 2 mm and a circular extrusion opening disposed outside the core extrusion opening and having an inner diameter of 5 mm and a slit width of 1.5 mm was used to extrude, in air, hydrophobic photopolymerizable composition (A-12) used in Example 12 through the core extrusion opening at a rate of 12 ml/min and simultaneously extrude hydrophilic liquid (D-3) used in Example 3 through the circular extrusion opening at a rate of 25 ml/min. The resultant extrudate consisted of the photopolymerizable composition (A-12) in a fiber form whose external surface was in contact with the hydrophilic liquid (D-3). At the time when the extrudate, which was descending from the nozzle, had reached to the range of from 30 to 60 cm in terms of distance from the nozzle, it was irradiated with ultraviolet rays at an intensity of 1,200 mW/cm$^2$. Thereafter, the extrudate was immersed in ethanol for 20 minutes, subsequently rinsed with running water for 1 hour, and then air-dried overnight. Thus, a fiber-form white porous material having a diameter of 1.6 mm was obtained.

The surface of the thus-obtained porous material was subjected to the measurement of water contact angle and elemental analysis. Because of the porosity of the material surface, water infiltrated into pores and, hence, the contact angle with water was unable to be measured. The results of the elemental analysis obtained are shown in Table 2. The hydrophilic surface layer of the material having hydrophilic surface obtained above had a thickness not larger than 10 μm.

EXAMPLE 14

Hydrophobic photopolymerizable composition (A-14) was obtained by homogeneously mixing 3.75 parts of a urethane acrylate oligomer having three acryloyl groups per molecule on the average (trade name, "Unidic V-4263"; manufactured by Dainippon Ink & Chemicals, Inc.), 1.25 parts of 1,6-hexanediol diacrylate (trade name, "Kayarad HDDA"; manufactured by Nippon Kayaku Co., Ltd.), 0.1 part of "Irgacure 184" (photopolymerization initiator), and 95 parts of acetone.

Subsequently, a nonwoven poly(ethylene terephthalate) (PET) fabric having a thickness of 0.15 mm ("MF-90"; manufactured by Japan Vilene Co., Ltd., Japan) which had been cut into a circle having a diameter of 60 mm was immersed in photopolymerizable composition (A-14). Ultrasonic waves were applied thereto for 1 minute to infiltrate the photopolymerizable composition (A-14) into the spaces among fibers of the fabric. Thereafter, the nonwoven fabric was taken out, and the acetone was evaporated at room temperature to obtain a nonwoven fabric in which fiber surfaces had been coated with hydrophobic photopolymerizable composition (A-14).

This nonwoven fabric was immersed in hydrophilic liquid (D-3) used in Example 3, and immediately irradiated with 100 mW/cm$^2$ ultraviolet rays for 40 seconds. Thereafter, the nonwoven fabric was taken out, immersed in ethanol for 20 minutes, rinsed with running water for 1 hour, and then air-dried overnight to obtain a hydrophilized nonwoven fabric.

The surface of the hydrophilized nonwoven fabric thus obtained was subjected to the measurement of water contact angle and elemental analysis. The contact angle with water was unable to be measured because water infiltrated into pores of the hydrophilized nonwoven fabric due to the porosity thereof, although the untreated nonwoven fabric did not absorb water droplets. The results of the elemental analysis obtained are shown in Table 2. The hydrophilic surface layer of the material having hydrophilic surface obtained above had a thickness not larger than 10 μm.

TABLE 2

| Item | Material Surface | | Hydrophilic Monomer (c) | |
|---|---|---|---|---|
| | Contact angle with water | Element ratio | Kind | Element ratio |
| Example 10 | 10° | C:O:N = 76:20:4 | Lightester DQ-75 | C:O:N = 75:17:8 |
| Example 11 | 9° | C:O:N = 78:19:3 | Lightester DQ-75 | C:O:N = 75:17:8 |
| Example 12 | — | C:O:N = 78:19:3 | Lightester DQ-75 | C:O:N = 75:17:8 |
| Example 13 | — | C:O:N = 78:19:3 | Lightester DQ-75 | C:O:N = 75:17:8 |
| Example 14 | — | C:O:N = 78:19:3 | Lightester DQ-75 | C:O:N = 75:17:8 |

Since the materials having hydrophilic surface obtained by the processes of the present invention have no hydrophilic groups inside, they have advantages in that they do not swell, are capable of retaining their intact structures, material properties, etc., and do not release hydrophilic groups. According to the processes of the present invention for producing a material having hydrophilic surface, hydrophilic groups can be incorporated only onto the surface of a material, and the kind and density of the hydrophilic groups, which are bonded to the material surface by covalent bonding, can be easily controlled. Furthermore, according to the processes of the present invention for producing a material having hydrophilic surface, high moldability is attained and a material of any desired shape can be formed. In addition, the processes of the present invention for producing a material having hydrophilic surface can be used not only for imparting hydrophilicity but also for easily producing a material having functional substituents on the surface thereof.

While the invention has been described in detail and with reference to specific embodiments thereof, it will be apparent to one skilled in the art that various changes and modifications can be made therein without departing from the spirit and scope thereof.

What is claimed is:

1. A process for producing a material having hydrophilic surface which comprises:
   (1) the first step of forming a hydrophobic photopolymerizable composition comprising a hydrophobic compound (a) having two or more polymerizable unsaturated double bonds per molecule and a photopolymerization initiator into a desired form selected from thin film, fiber, bead, and other forms to produce a shape (b);
   (2) the second step of bringing the surface of the shape (b) into contact with a hydrophilic liquid (d) containing a hydrophilic compound (c) having one or more polymerizable unsaturated double bonds; and
   (3) the third step of irradiating the shape (b) with actinic rays while keeping the shape (b) in contact with the hydrophilic liquid (d),
   (4) said third step being conducted in such a manner that
      (i) the shape (b) is cured,
      (ii) the hydrophobic compound (a) is copolymerized with the hydrophilic compound (c) at the interface between the shape (b) and the hydrophilic liquid (d) to thereby chemically bond molecules of the hydrophilic compound (c) to the surface of the hydrophobic shape (b), and
      (iii) the hydrophilic liquid (d) is prevented from undergoing any photopolymerization reaction therein except at said interface.

2. A process for producing a material having hydrophilic surface which comprises:
   (1) the first step of forming a hydrophobic photopolymerizable composition comprising a hydrophobic compound (a) having two or more polymerizable unsaturated double bonds per molecule and a photopolymerization initiator into a desired form selected from thin film, fiber, bead, and other forms to produce a shape (b);
   (2) the second step of irradiating the shape (b) with actinic rays to precure the shape (b) to such a degree that the resultant precured shape (b) has polymerizable unsaturated double bonds remaining at least on the surface thereof;
   (3) the third step of bringing the surface of the precured shape (b) into contact with a hydrophilic liquid (d) containing a hydrophilic compound (c) having one or more polymerizable unsaturated double bonds; and
   (4) the fourth step of irradiating the precured shape (b) with actinic rays while keeping the precured shape (b) in contact with the hydrophilic liquid (d),
   (5) said fourth step being conducted in such a manner that
      (i) the precured shape (b) is completely cured,
      (ii) the hydrophobic compound (a) is copolymerized with the hydrophilic compound (c) at the interface between the shape (b) and the hydrophilic liquid (d) to thereby chemically bond molecules of the hydrophilic compound (c) to the surface of the hydrophobic shape (b), and
      (iii) the hydrophilic liquid (d) is prevented from undergoing any photopolymerization reaction therein except at said interface.

3. The process as claimed in claim 1, wherein the shape (b) is brought into contact with the hydrophilic liquid (d) by immersing the shape (b) in the hydrophilic liquid (d).

4. The process as claimed in claim 1, wherein the photopolymerizable composition contains an ingredient which is miscible with the hydrophobic compound (a) having two or more polymerizable unsaturated double bonds per molecule and in which the cured polymer formed from the hydrophobic compound (a) having two or more polymerizable unsaturated double bonds per molecule neither dissolves nor swells.

5. The process as claimed in claim 1, wherein the hydrophilic liquid (d) contains a surfactant.

6. The process as claimed in claim 1, wherein the hydrophilic compound (c) having one or more polymerizable unsaturated double bonds is a compound having amino acid structure in the molecule.

7. The process as claimed in claim 1, wherein the compound (c) having one or more polymerizable unsaturated double bonds and one or more hydrophilic groups is a compound having saccharide structure in the molecule.

8. The process as claimed in claim 2, wherein the shape (b) is brought into contact with the hydrophilic liquid (d) by immersing the shape (b) in the hydrophilic liquid (d).

9. The process as claimed in claim 2, wherein the photopolymerizable composition contains an ingredient which is miscible with the hydrophobic compound (a) having two or more polymerizable unsaturated double bonds per molecule and in which the cured polymer formed from the hydrophobic compound (a) having two or more polymerizable unsaturated double bonds per molecule neither dissolves nor swells.

10. The process as claimed in claim 2, wherein the hydrophilic liquid (d) contains a surfactant.

11. The process as claimed in claim 2, wherein the hydrophilic compound (c) having one or more polymerizable unsaturated double bonds is a compound having amino acid structure in the molecule.

12. The process as claimed in claim 2, wherein the compound (c) having one or more polymerizable unsaturated double bonds and one or more hydrophilic groups is a compound having saccharide structure in the molecule.

* * * * *